DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 29, 1970

878 O.G. 1148

T878,019

ELECTROPHORETIC CHARGING METHOD AND APPARATUS

William E. Hunt, 901 Elmgrove Road, Rochester, N.Y. 14650

Filed Feb. 6, 1970, Ser. No. 9,382
Int. Cl. B01k *5/00*
U.S. Cl. 204—181
1 Sheet Drawing. 7 Pages Specification

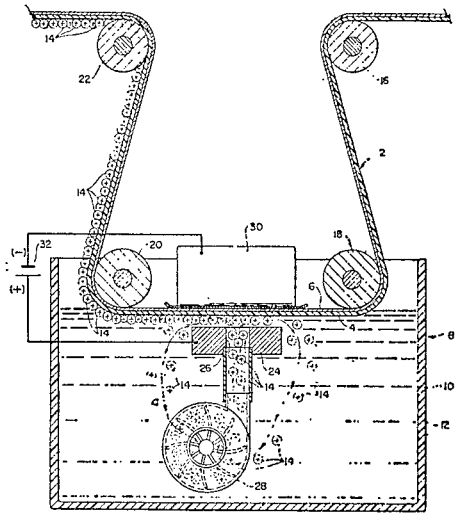

Electrophoretic charging of a photoconductive member 2 is accomplished by applying a potential from source 32 between a conductive backing 6 on the photoconductive member and an electrode 24 spaced therefrom which acts upon charged transparent particles 14 dispersed in a dielectric liquid 12 therebetween. The field which is created between the photoconductive member and the electrode causes the charged particles to be uniformly distributed across the photoconductive surface 4 which surface may then be subjected to further electrophotographic procedures.

Sept. 29, 1970 W. E. HUNT T878,019
ELECTROPHORETIC CHARGING METHOD AND APPARATUS
Filed Feb. 6, 1970
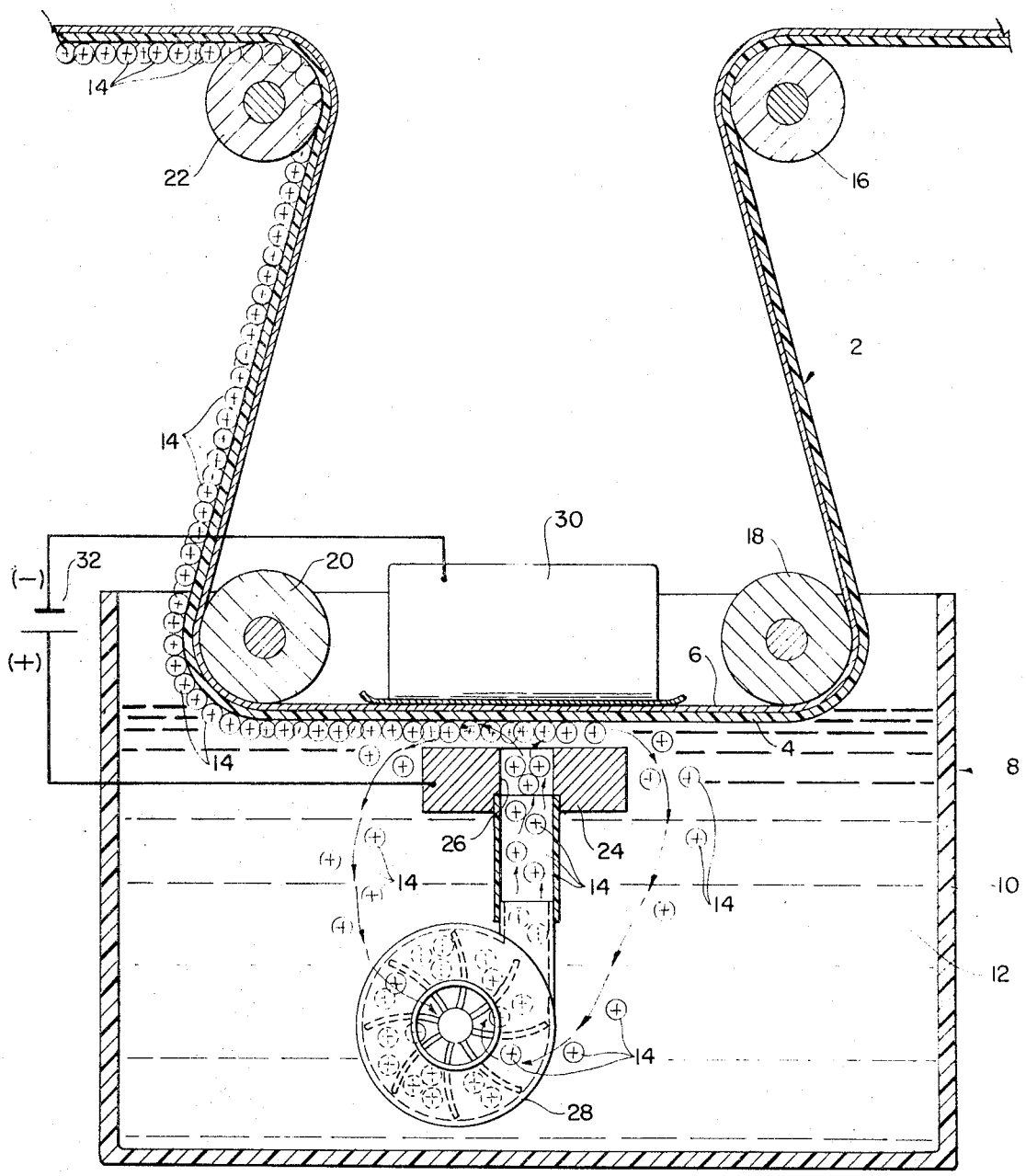
WILLIAM E. HUNT
INVENTOR.
BY Gary D. Fields
Robert W. Hampton
ATTORNEYS